July 24, 1973    M. L. LERNER    3,748,097
METHOD AND APPARATUS FOR DETECTING HALOGEN GROUP GAS
Filed March 2, 1972

United States Patent Office 3,748,097
Patented July 24, 1973

3,748,097
METHOD AND APPARATUS FOR DETECTING HALOGEN GROUP GAS
Martin L. Lerner, River Forest, Ill., assignor to Zenith Radio Corporation, Chicago, Ill.
Filed Mar. 2, 1972, Ser. No. 231,352
Int. Cl. G01n 21/24
U.S. Cl. 23—232 E                                10 Claims

ABSTRACT OF THE DISCLOSURE

A method of detecting chlorine gas entails mixing copper particles with a silver activated blue phosphor compound and exposing this mixture to an environment suspected of containing chlorine gas to convert a portion of the copper to copper chloride. The exposed mixture is reacted by heating it to a temperature sufficient to cause the copper chloride to accelerate diffusion of copper atoms into the crystal lattice network of the phosphor. The reacted mixture is excited with a source of radiant energy and the spectral emission of the reacted mixture is then detected and compared with the spectral emission of the blue phosphor compound to determine if a shift in spectral emission, which is indicative of the presence of chlorine, has occurred.

---

This invention relates in general to a method and apparatus for detecting the presence of a gas and in particular to the detection of a halogen group gas that tends to poison the phosphor screen of a color reproducing cathode ray tube.

The cathode ray tube conventionally employed in a color TV receiver comprises a face panel, upon which a luminescent screen is deposited, and a funnel section that encloses a trio of electron beam guns for exciting the screen. The screen, which is processed before the face panel is mated to the funnel, is formed of a myriad of phosphor dots arranged in clusters or triads each including a red, a green and a blue phosphor element. In view of the susceptibility of many of the tube's constituents to contaminants, in particular the phosphors, the environment of the manufacturing facility must be diligently checked if poisoning of the screen is to be avoided. However, prior art contaminant detectors, gas detectors in particular, are characterized by a less than satisfactory sensitivity. Moreover, their cost prohibits their use as permanent monitors in a large number of locations in the manufacturing facility.

The subject invention is therefore concerned with detecting minute quantities of air borne contaminants, specifically gases, which alone or in concert with other elements, interact with a phosphor material to alter the spectral emission, i.e., color content, of the light energy emitted by the phosphor. More particularly, it has been determined that when a copper contaminated blue phosphor of the silver activated zinc sulfide type is exposed to a gas in the halogen group, a reaction takes place such that the spectral emission of the phosphor material, after bakeout, shifts toward green. As a result the screen effectively loses one of its primary colors, blue.

It is therefore a general object of the invention to provide an improved method for detecting the presence of a halogen group gas.

It is a particular object of the invention to provide a method for detecting the presence of a gas that adversely reacts upon the spectral emission of a light emitting phosphor.

It is also an object of the invention to provide apparatus for detecting the presence of a halogen group gas that tends to adversely affect the spectral emission of a light-emitting phosphor.

It is a specific object of the invention to provide an improved method and apparatus for detecting chlorine gas which are characterized by significant improvements in sensitivity and economy over prior art practices.

SUMMARY OF THE INVENTION

In accordance with the invention a method for detecting the presence of a halogen group derivative comprises the steps of first mixing a quantity of copper particles with a silver activated phosphor compound which normally exhibits a predetermined spectral emission upon excitation by a source of radiant energy. The phosphor mixture is then exposed to an environment containing a halogen group derivative in order to convert the copper particles to a copper halogen compound. The exposed mixture is then reacted by heating it to a temperature sufficient to cause the copper halogen compound to accelerate the diffusion of copper atoms into the crystal lattice network of the phosphor compound. The reacted mixture is excited by a source of radiant energy and then the spectral emission of this mixture is detected. The presence of a halogen group derivative is then ascertained by effecting a comparison between the spectral emission of the phosphor compound and that of the reacted mixture. The invention also contemplates an apparatus for detecting a halogen group gas.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawing, in the several figures of which like reference numerals indicate like elements and in which:

DESCRIPTION OF THE PREFERRED EMBODIMENT

Basically, the inventive process contemplates a method for detecting a derivative in the halogen group. Specifically, the invention is concerned with detecting chlorine gas, a particularly reactive member of the halogen group, in an area in which phosphor screening is being undertaken or in an area through which a completed screen panel is transported or is stored. As previously noted, it is the blue phosphor which is of concern as that is the constituent of the screen most prone to poisoning, i.e., alteration of its spectral emission.

By dint of investigation it has been found that minute particles of copper tend to permeate much of the atmosphere in a cathode ray tube manufacturing facility. This obtains because sources of copper particulate are legion, for example, electric motors and generators, switches, commutators, contact rails, etc.; apparatus commonly found in industrial plants. However, it has been determined that copper itself, in the absence of a reagent, does not always occasion poisoning of the blue phosphor. Extensive investigation and experimentation have established that in the halogen group of gases, chlorine in particular, is a very active reagent. Because of its volatile nature chlorine can, unchecked, be a widespread contaminant. Sources of chlorine in a tube manufacturing plant are also manifold in that it can emanate from the chlorine gas used to regenerate metal etchants as well as from halogenated degreasers, such as trichlorethylene.

Figure 1:
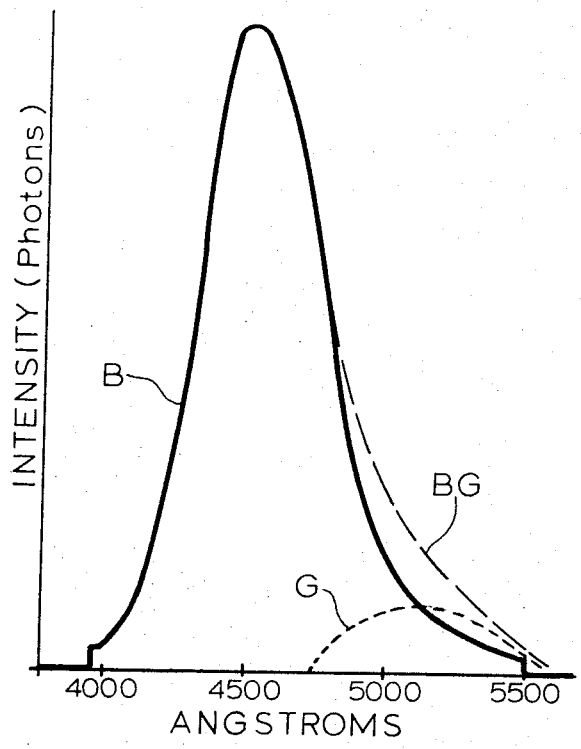
FIG. 1 is a graphical representation of the spectral emissions of light-emitting phosphor compounds.

In any event, the fallout of copper particulate into blue phosphor slurries or upon a screened faceplate is not necessarily of itself a serious contaminant insofar as poisoning or impairment of the blue phosphor is concerned. The problem arises when a halogen group gas such as chlorine is present. More particularly, when a blue phosphor, such as silver activated zinc sulfide having a predetermined spectral emission centering on approximately 4500 A., see curve B in FIG. 1, is contaminated by copper particles and then exposed to chlorine gas, the copper particles are converted to a copper halogen compound, namely, copper chloride. Thereafter, when the temperature of the phosphor is raised, as is the case when the screened face panel is transported through the bake-out oven, the copper chloride accelerates the diffusion of the copper atoms into the crystal lattice network of the zinc sulfide to create a chemically altered phosphor mixture.

Subsequently, when this screen is excited, for example, by electron bombardment, the blue phosphor will exhibit a spectral emission characteristic of the chemically altered zinc sulfide. This phosphor will now emit not only blue light but also a greenish light which, to the eye of the viewer, overpowers the blue because of the fact that the human retina is more responsive to green light. As a result the three-color screen is now effectively reduced to a two-color screen since the blue phosphors are no longer capable of emitting sufficient blue light to markedly distinguish them from the green phosphors. This shift in the spectral emission of a contaminated blue phosphor is graphically depicted in FIG. 1 where the color contribution attributable to the diffusion of copper atoms into the crystal lattice of the zinc sulfide is shown by the dotted curve G while the resultant light output of the contaminated phosphor is now represented by the dashed line BG.

Attention is now addressed to a method capable of detecting concentrations of chlorine gas as small as one part in ten million. The method is amenable to practice anywhere in a plant or environment where blue phosphor materials are stored or are being processed or where a screened face panel is stored or processed. The most practical method of practicing the invention contemplates utilizing a chlorine monitor in the form of a receptacle or boat into which a mixture of silver activated zinc sulfide and copper is introduced. In practice a number of boats are prepared with this mixture and then placed in various locations in the manufacturing facility and storage areas where chlorine monitoring is deemed necessary or desirable. Depending upon the sensitivity of a particular location to the tube manufacturing operation, the boat may be left exposed to the environment for a period as short as an hour or for periods extending over several days. In any event when it is desired to test a particular location for chlorine contamination, the mixture in the monitoring boat is reacted by heating it to a temperature sufficient to cause any copper chloride, formed by the interaction of chlorine with the copper particles, to accelerate the diffusion of copper atoms into the crystal lattice network of the phosphor compound. A temperature approaching 450° C. has been found adequate to achieve the desired diffusion of the copper atoms. Thereafter when the mixture in the boat has cooled, it is irradiated by a source of radiant energy such as ultra-violet light, to cause the reacted mixture to emit light waves. If there was no chlorine gas present in the environment monitored by the boat then the spectral emission of the reacted phosphor would be predominantly blue. Graphically, curve B in FIG. 1 would be representative of this emission. On the other hand, if chlorine was present in the location from which the boat was retrieved, then the diffusion of copper atoms into the crystal lattice of the phosphor would cause the spectral emission of the phosphor to shift toward green as indicated by curve BG in FIG. 1.

Figure 2:
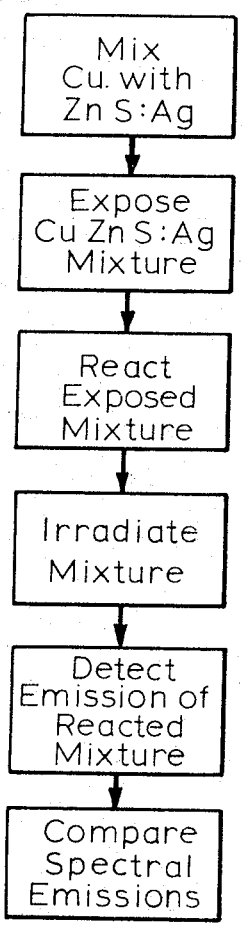
FIG. 2 is a flow chart that graphically illustrates the invention method.

This method, which is depicted in the flow chart in FIG. 2, serves not only to detect the presence of chlorine but when the degree of color shift exhibited by the reacted phosphor is compared to the spectral emission of uncontaminated silver activated zinc sulfide, a reliable indication of the extent of chlorine contamination is provided.

Figure 3:
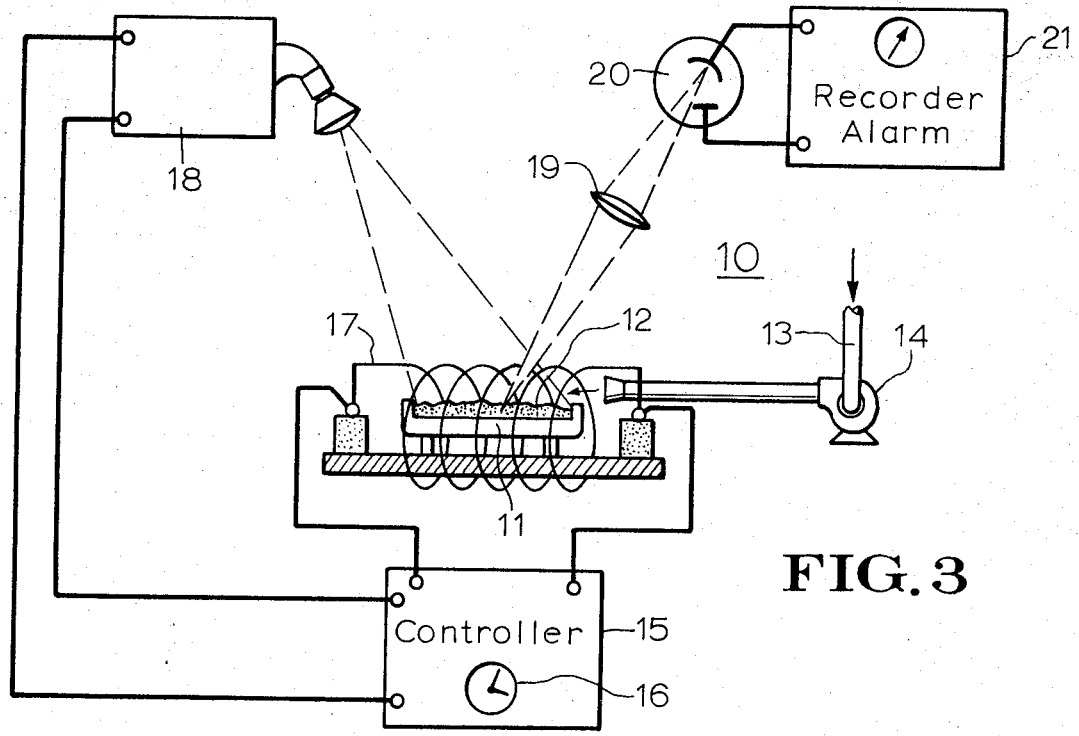
FIG. 3 is an illustration, partially in schematic form, of an apparatus for detecting a halogen group gas.

In order to provide a constant and automatic monitor of a particular environment an arrangement such as the apparatus shown in FIG. 3 finds particular utility. Specifically, the gas detecting apparatus 10 of FIG. 3 comprises a receptacle or boat 11 into which a mixture 12 of silver activated zinc sulfide and approximately one percent, by weight, of copper particles is introduced. Desirably the boat comprises a small open vessel approximately three inches long, one-half inch wide and one-fourth inch deep. These dimensions, of course, are not critical. The atmosphere in a desired location is then monitored by drawing a sample of air through duct 13 and directing a flow of that sample across the surface of mixture 12 by an electric fan or air pump 14. At such times as a reading of the atmosphere in the monitored location is desired, a controller 15, desirably acturated by a timer 16, energizes an induction coil heater 17 which encircles a platform upon which boat 11 is supported and which raised the temperature of the exposed mixture in the boat to approximately 450° C. In utilizing induction heating, boat 11, of course, would be constructed of a conductive material. The timer then de-energizes the control circuit for the induction heater and energizes a source of radiant energy, e.g., ultra-violet light 18, which irradiates the surface of the phosphor. A portion of the light emitted by mixture 11 is intercepted by a green filter 19 having a predetermined light wave passband. The light energy transmitted by the filter is applied to a photocell 20 which in turn, is coupled to an alarm or recording mechanism 21. Accordingly, if the phosphor mixture in the boat has been exposed to chlorine, the spectral emission of the phosphor upon excitation by source 18 would include green light waves which would be transmitted by filter 19 to the photocell causing mechanism 21 to make a record or give an alarm. In the absence of chlorine gas, on the other hand, the spectral emission of phosphor mixture 12 would not produce green light for transmission to the photocell and therefore, the recording mechanism would not be activated.

The invention further contemplates the situation where boats containing the copper-phosphor mixture can be spotted at various locations in the plant and then subsequently collected for interrogation by apparatus 10. Moreover, by virtue of their small size, these boats can readily be transported through a bakeout oven or upon a conveyor to other relatively inaccessible areas in order to monitor those environments for chlorine contamination. In the first situation, oven monitoring, the bakeout temperature reacts the mixture so that upon retrieving the boat it is only necessary to irradiate the reacted mixture to determine the presence or absence of chlorine. In other situations where high temperatures would not be encountered, the mixture would require heating to achieve the desired diffusion of copper into the phosphor. It should be appreciated that the type of heating, i.e., induction, thermal, etc., is of no consequence so long as the desired reaction of the phosphor mixture is attained. Finally, it is apparent that the described method and apparatus permits blanket monitoring of an entire manufacturing facility at an insignificant cost compared to prior art gas detection methods and apparatus.

While particular embodiments of the invention have been shown and described, modifications may be made, and it is intended in the appended claims to cover all

I claim:

1. A method of detecting the presence of a halogen group derivative which comprises the following steps:

mixing a quantity of copper particles with a silver activated phosphor compound, which compound exhibits a predetermined spectral emission upon excitation by a source of radiant energy;

exposing said phosphor mixture to an environment containing a gas derivative in said halogen group to convert a portion of said copper particles to a copper halogen compound;

reacting said exposed phosphor mixture by heating it to a temperature sufficient to cause said copper halogen compound to accelerate diffusion of copper atoms into the crystal lattice network of said phosphor compound;

exciting said reacted phosphor mixture with a source of radiant energy;

detecting the spectral emission characteristic of said reacted mixture;

and ascertaining the presence of a halogen group derivative by effecting a comparison between said predetermined spectral emission of said phosphor compound and said characteristic spectral emission of said reacted phosphor mixture.

2. The method set forth in claim 1 in which said phosphor mixture is exposed to chlorine gas.

3. The method set forth in claim 1 in which said exposed phosphor mixture is heated to a temperature of approximately 450° C.

4. The method set forth in claim 1 in which said reacted phosphor mixture is excited with a source of ultraviolet light.

5. The method set forth in claim 1 which includes the additional step of applying the spectral emission of said reacted mixture to a filter having a predetermined light wave passband.

6. The method set forth in claim 5 which includes the additional step of applying the output of said filter to a light wave responsive device for signifying the presence of spectral emission in said predetermined passband.

7. Apparatus for detecting the presence of a halogen group derivative comprising:

A receptacle containing a mixture comprising a silver activated phosphor compound which exhibits a predetermined spectral emission upon excitation by a source of radiant energy and a quantity of copper particles;

means for exposing said mixture to an environment that includes a gas derivative in said halogen group;

means for heating said exposed mixture to a temperature sufficient to cause said copper halogen compound to accelerate the diffusion of copper atoms into the crystal lattice network of said phosphor compound;

a source of radiant energy for exciting said reacted mixture;

and means for detecting the spectral emission of said reacted mixture.

8. Apparatus as set forth in claim 7 in which said phosphor compound comprises zinc sulfide and said halogen group gas comprises chlorine.

9. Apparatus as set forth in claim 7 in which said receptacle is formed of conductive material and said heating means comprises an induction coil.

10. Apparatus as set forth in claim 7 in which said detecting means comprises a green filter and a photocell for detecting the green light output from said reacted mixture.

References Cited

UNITED STATES PATENTS

| | | | |
|---|---|---|---|
| 2,774,652 | 12/1956 | Vonnegut | 23—232 R |
| 3,036,895 | 5/1962 | Cole | 23—232 E |
| 3,655,978 | 4/1972 | Faria et al. | 250—71 R X |

MORRIS O. WOLK, Primary Examiner

R. M. REESE, Assistant Examiner

U.S. Cl. X.R.

250—71 R